June 6, 1939.  W. F. GROENE ET AL  2,160,966
LATHE APRON MECHANISM
Filed May 23, 1938  16 Sheets-Sheet 2
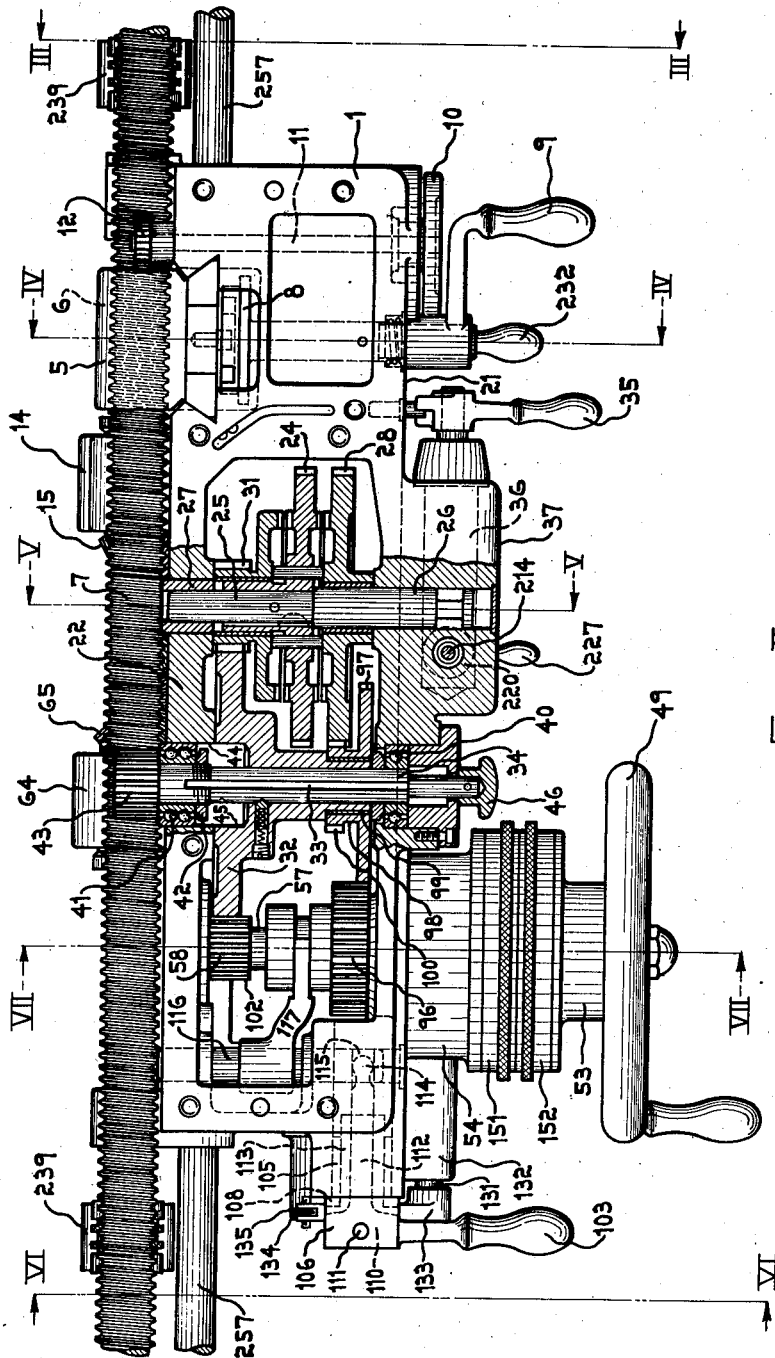
FIG. II
WITNESS.
Orlando S. Knox
INVENTORS.
WILLIAM F. GROENE
HARRY C. KEMPER
BY Willard L. Groene
ATTORNEY.

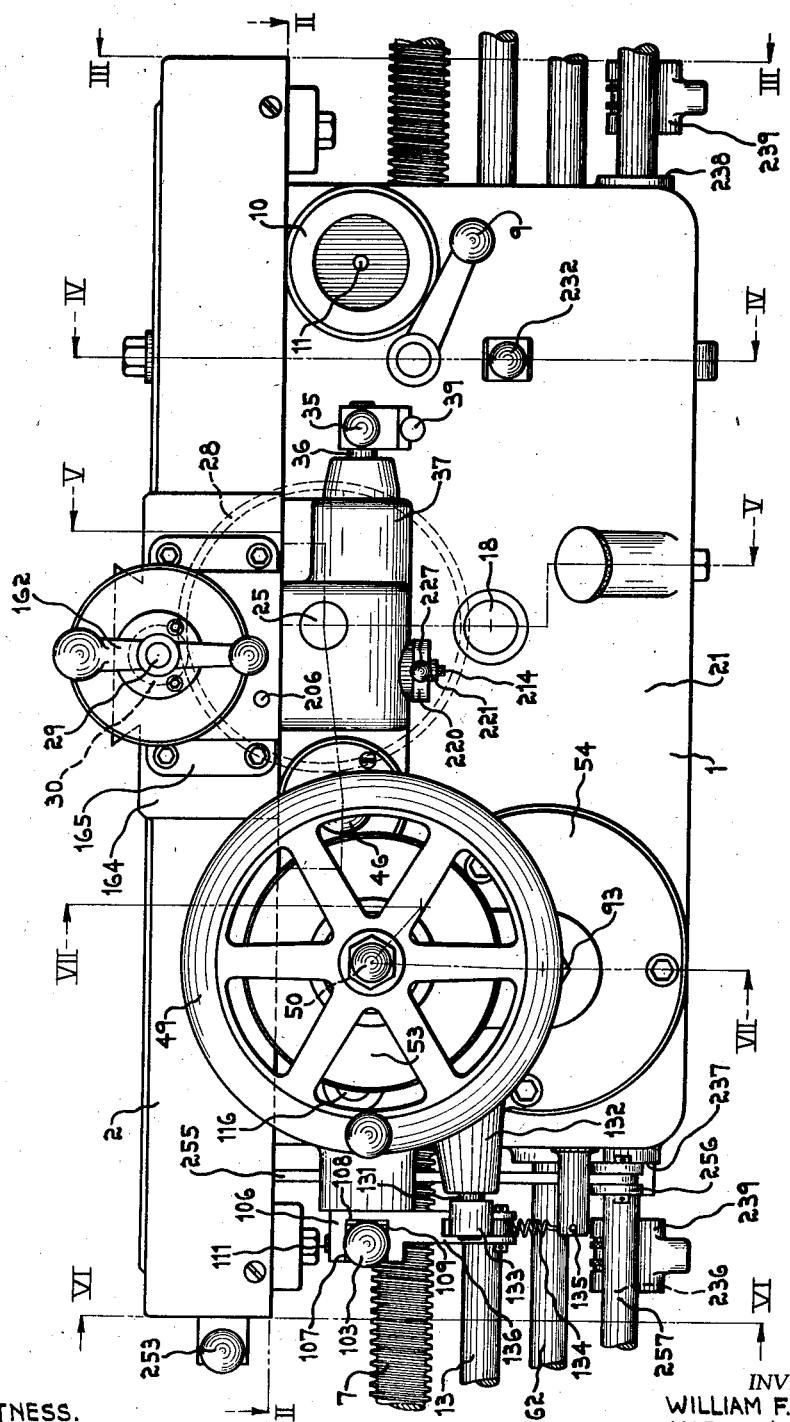

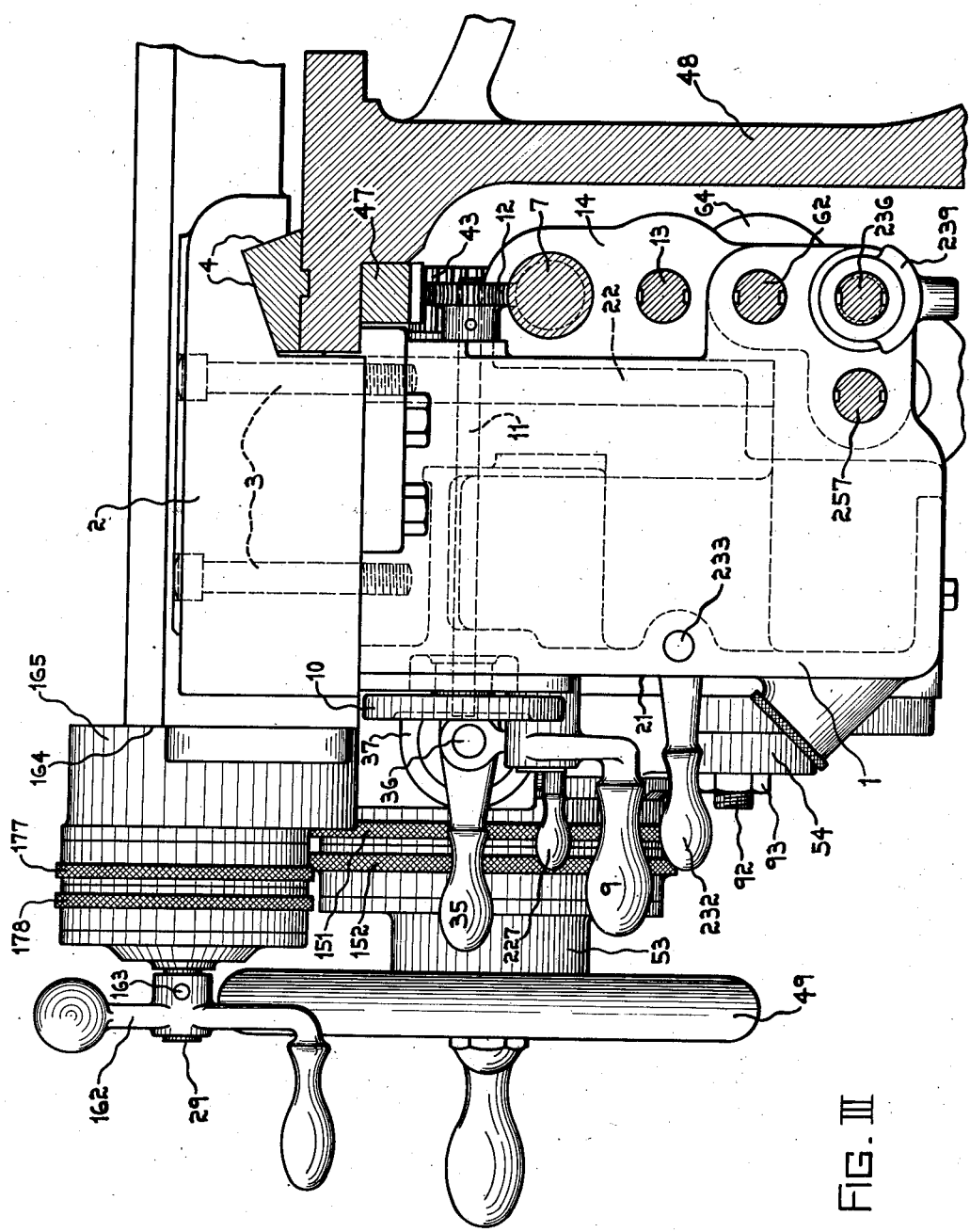

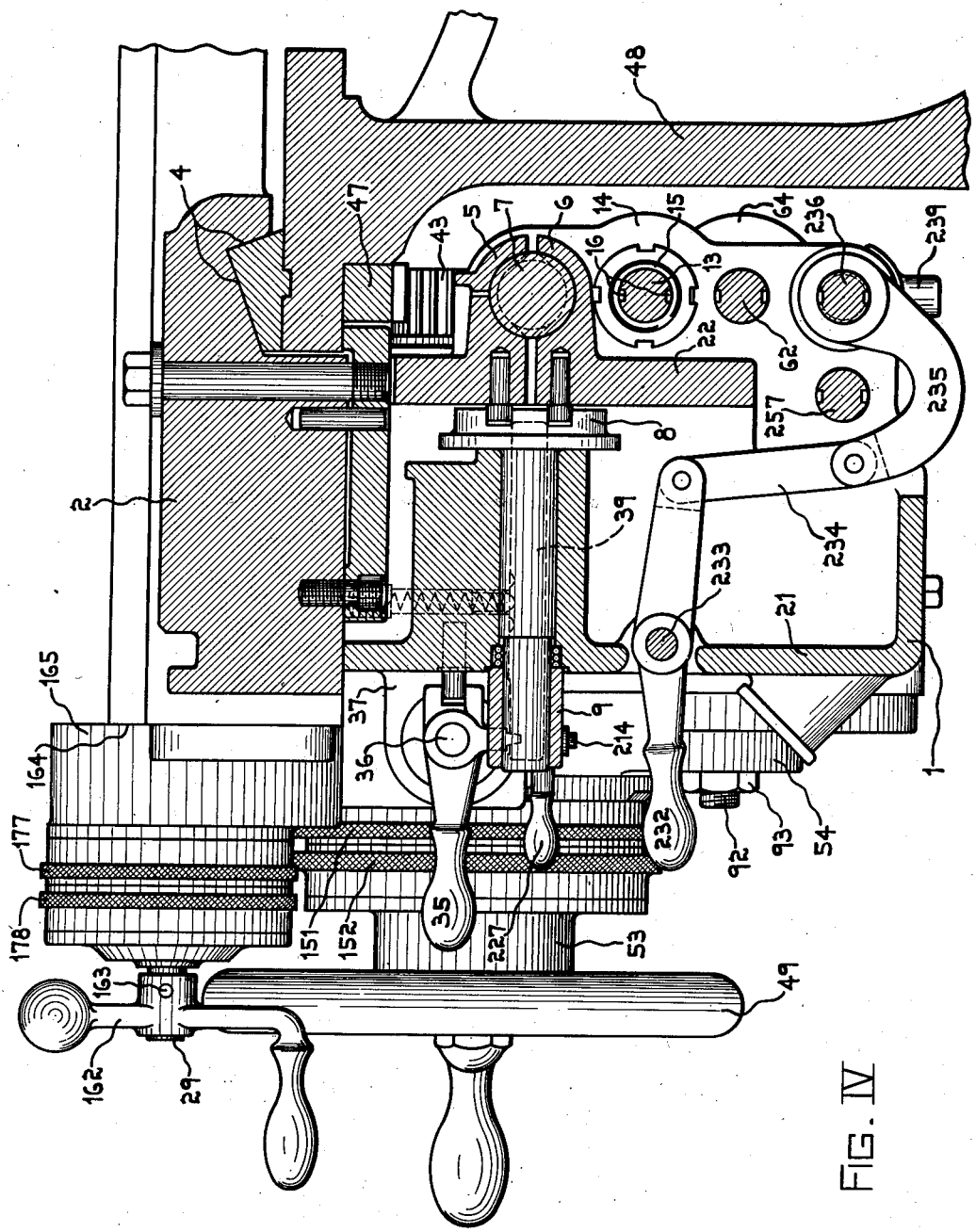

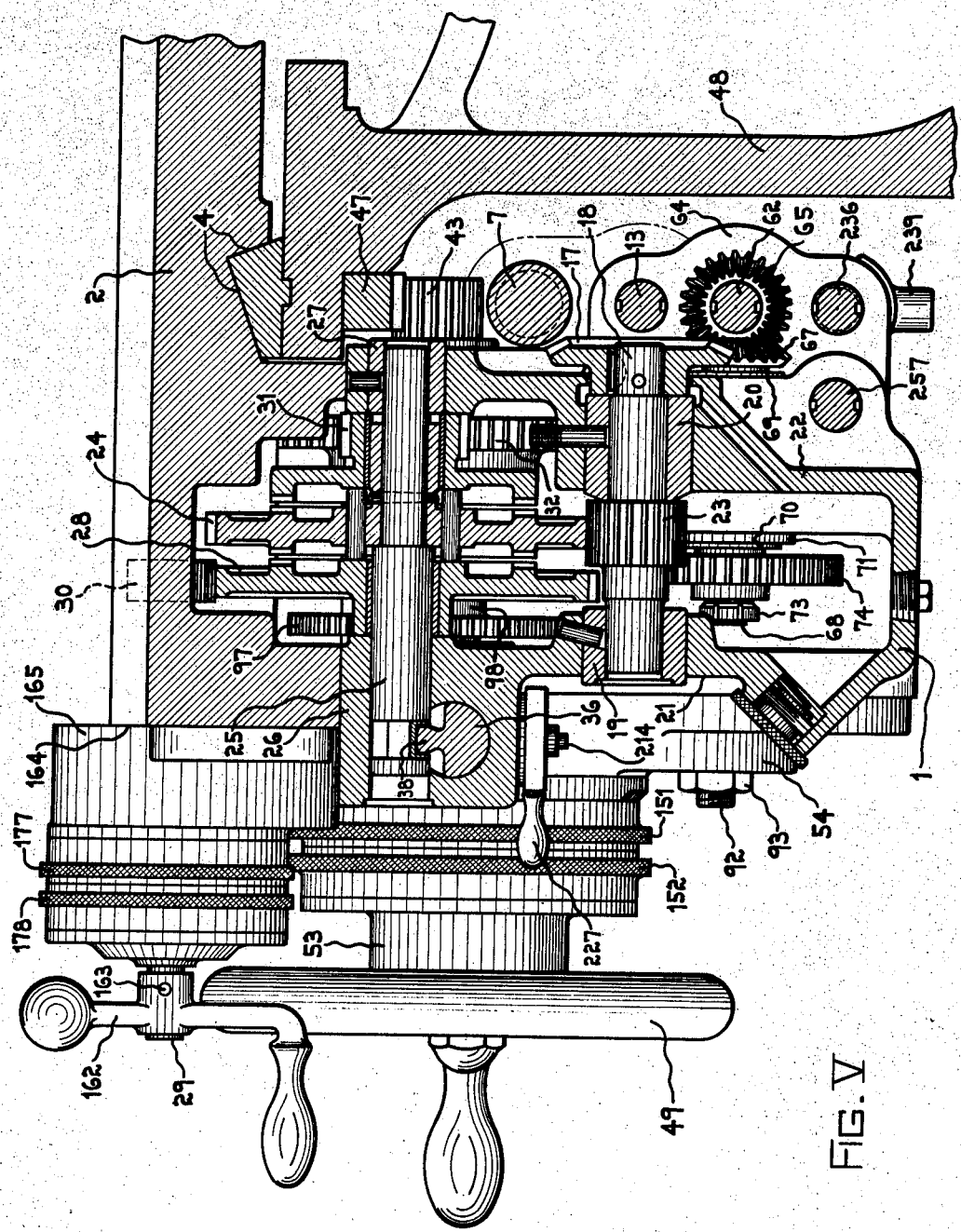

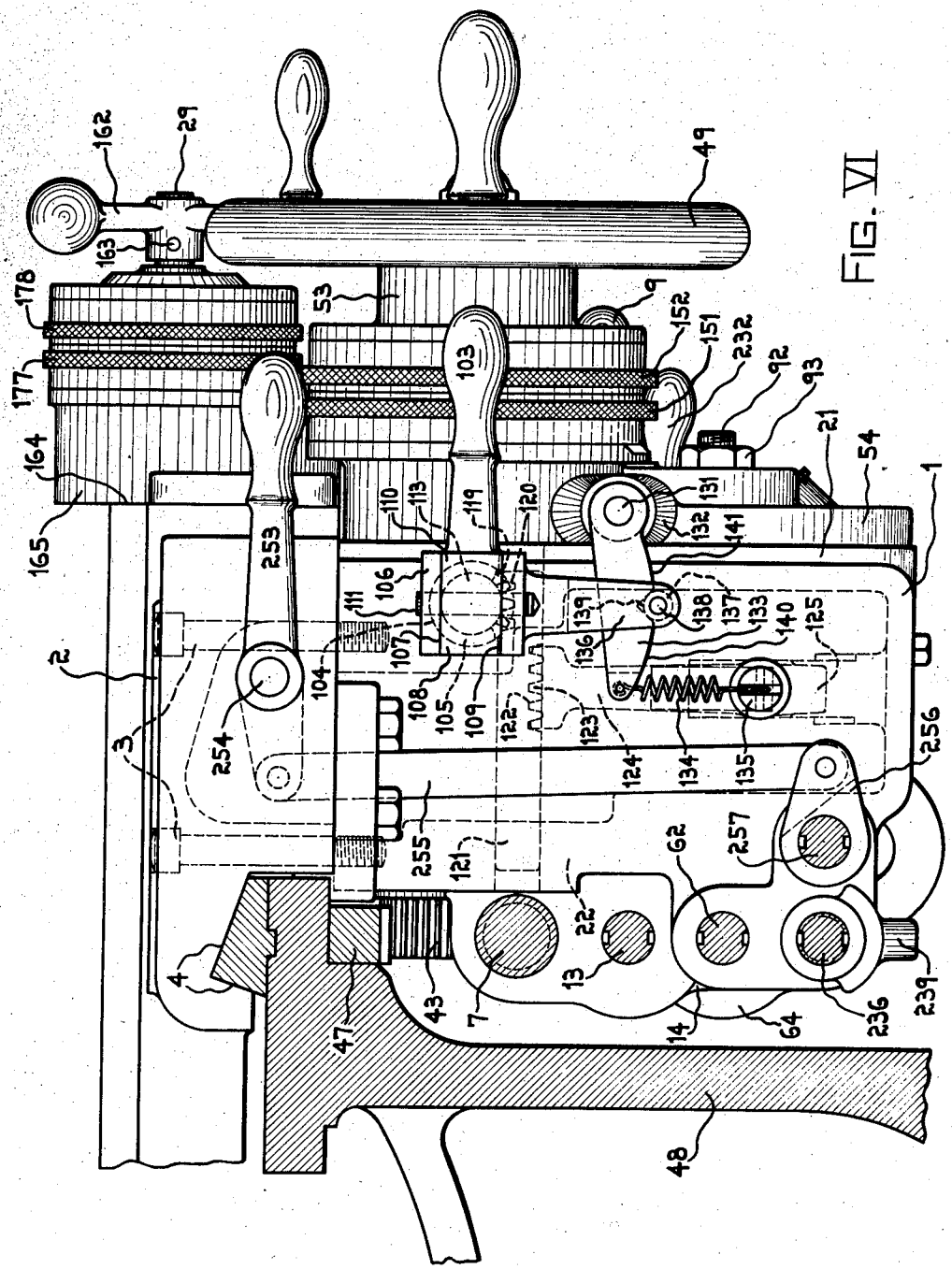

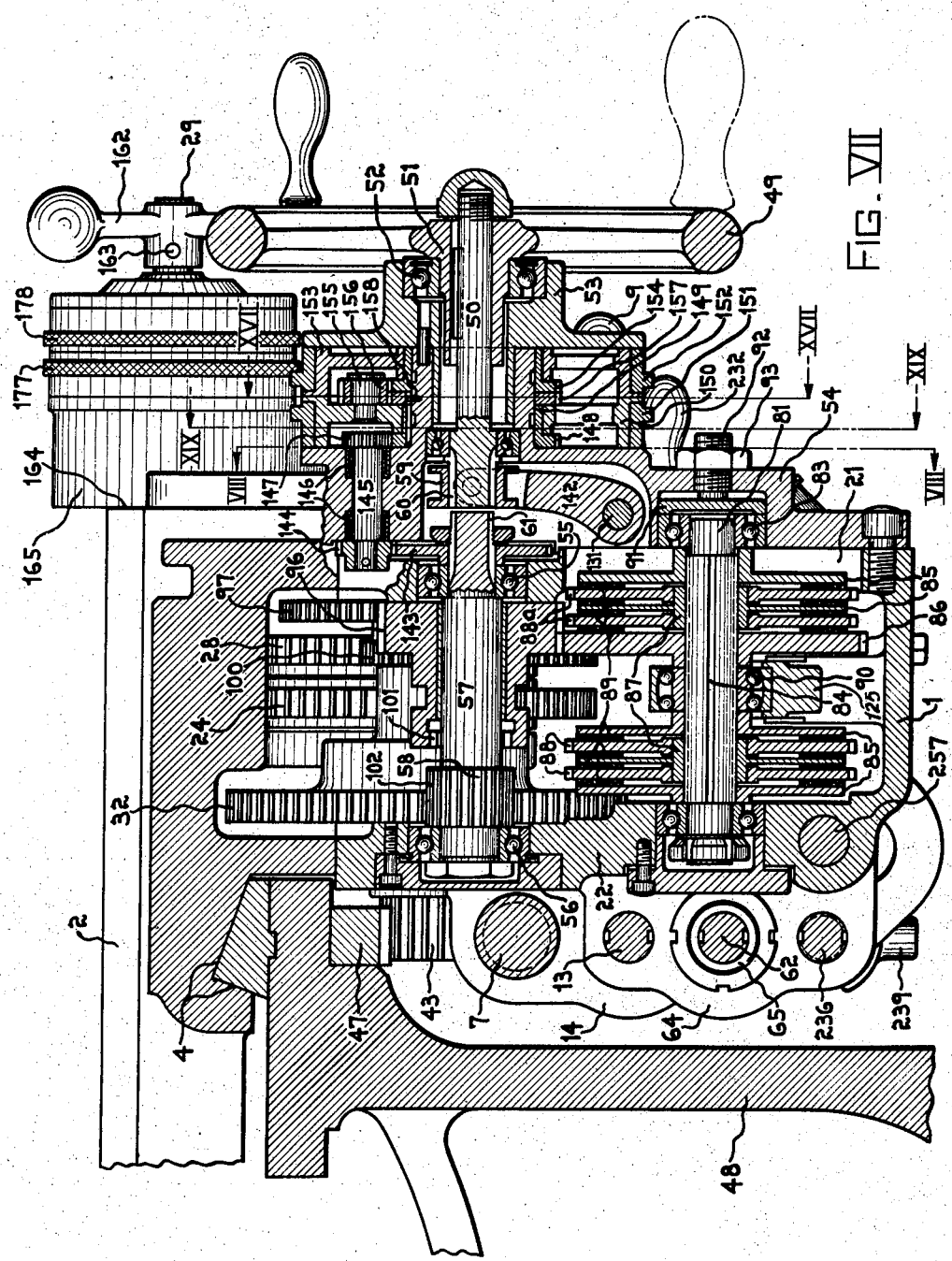

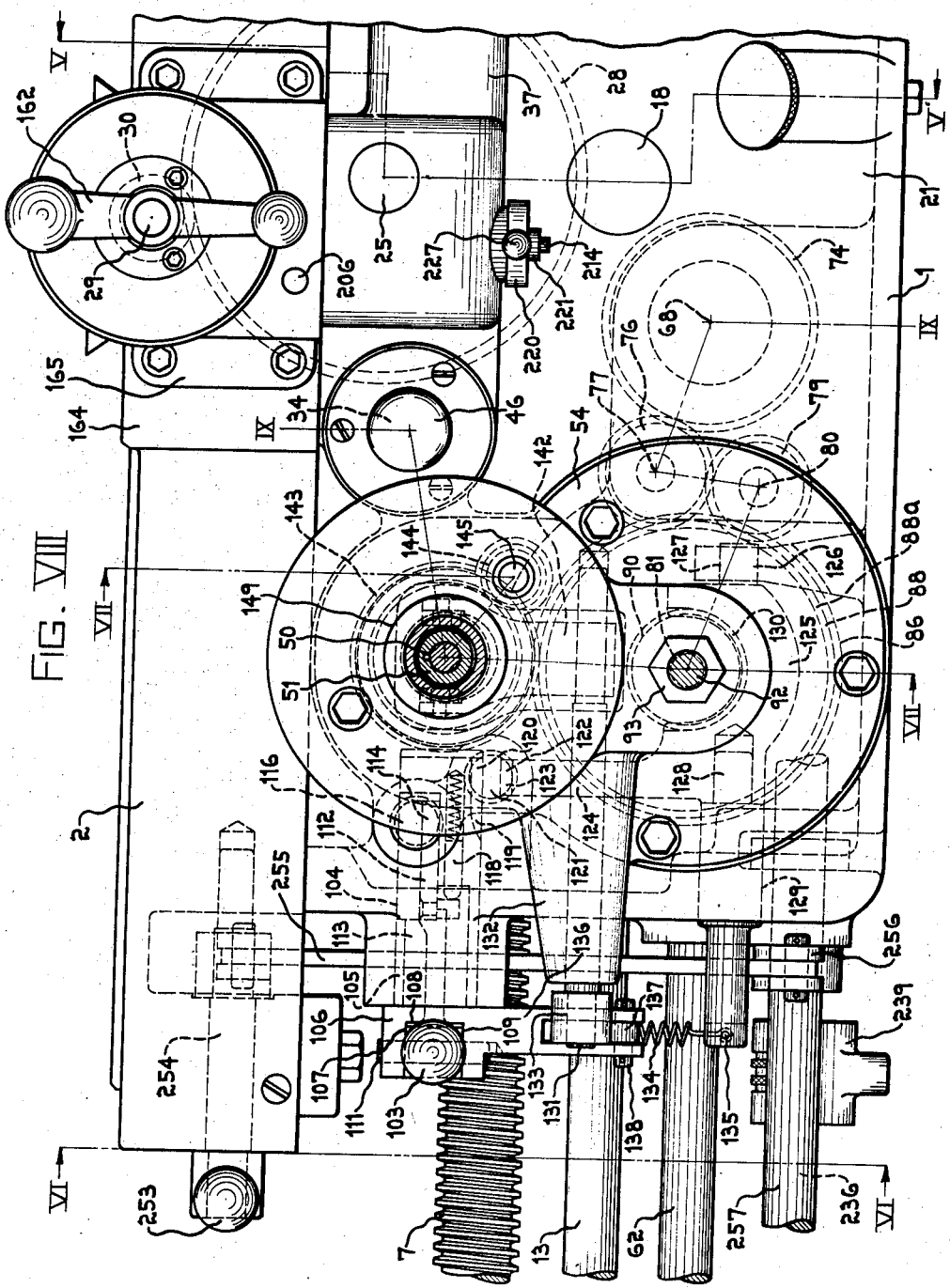

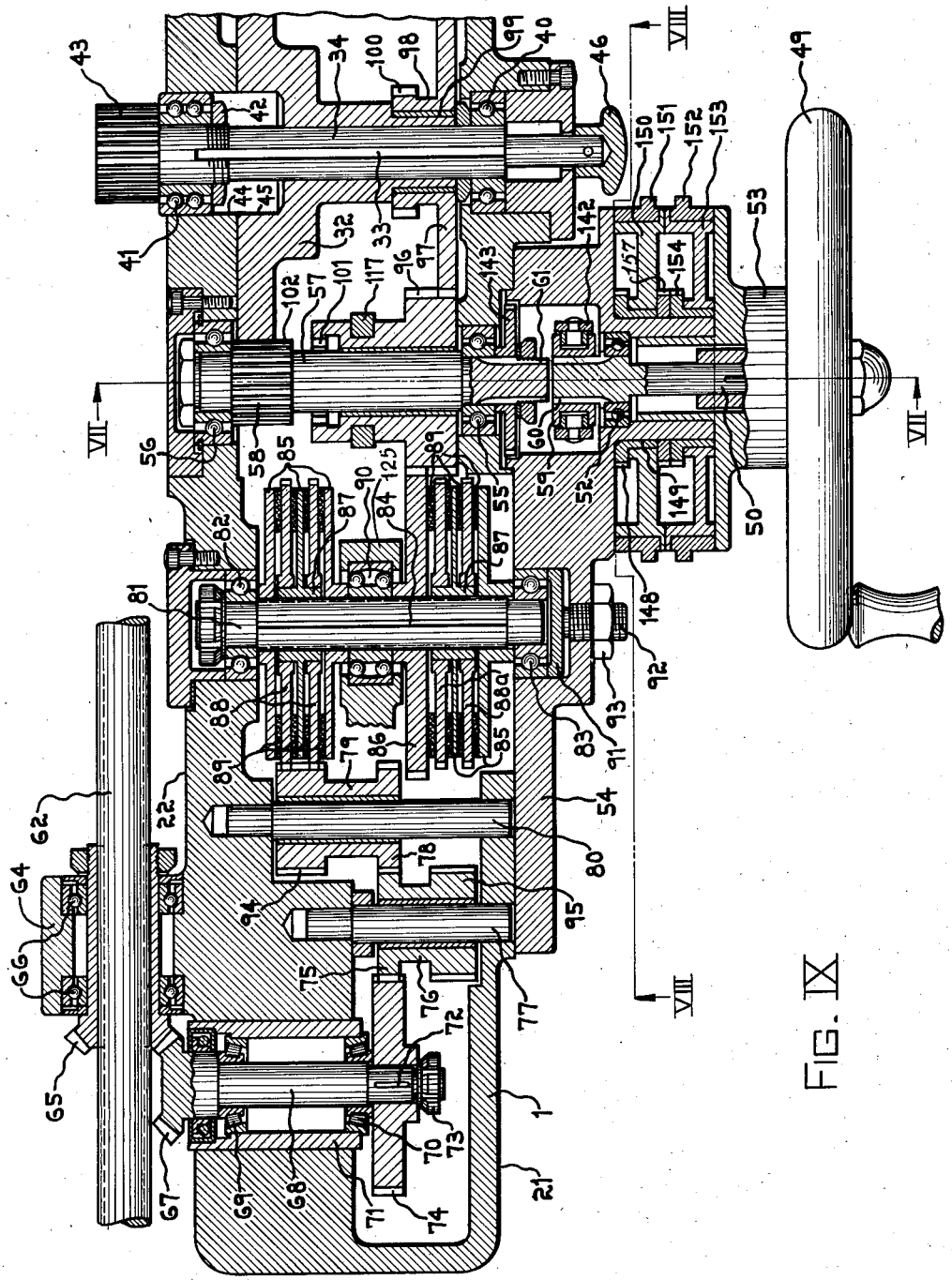

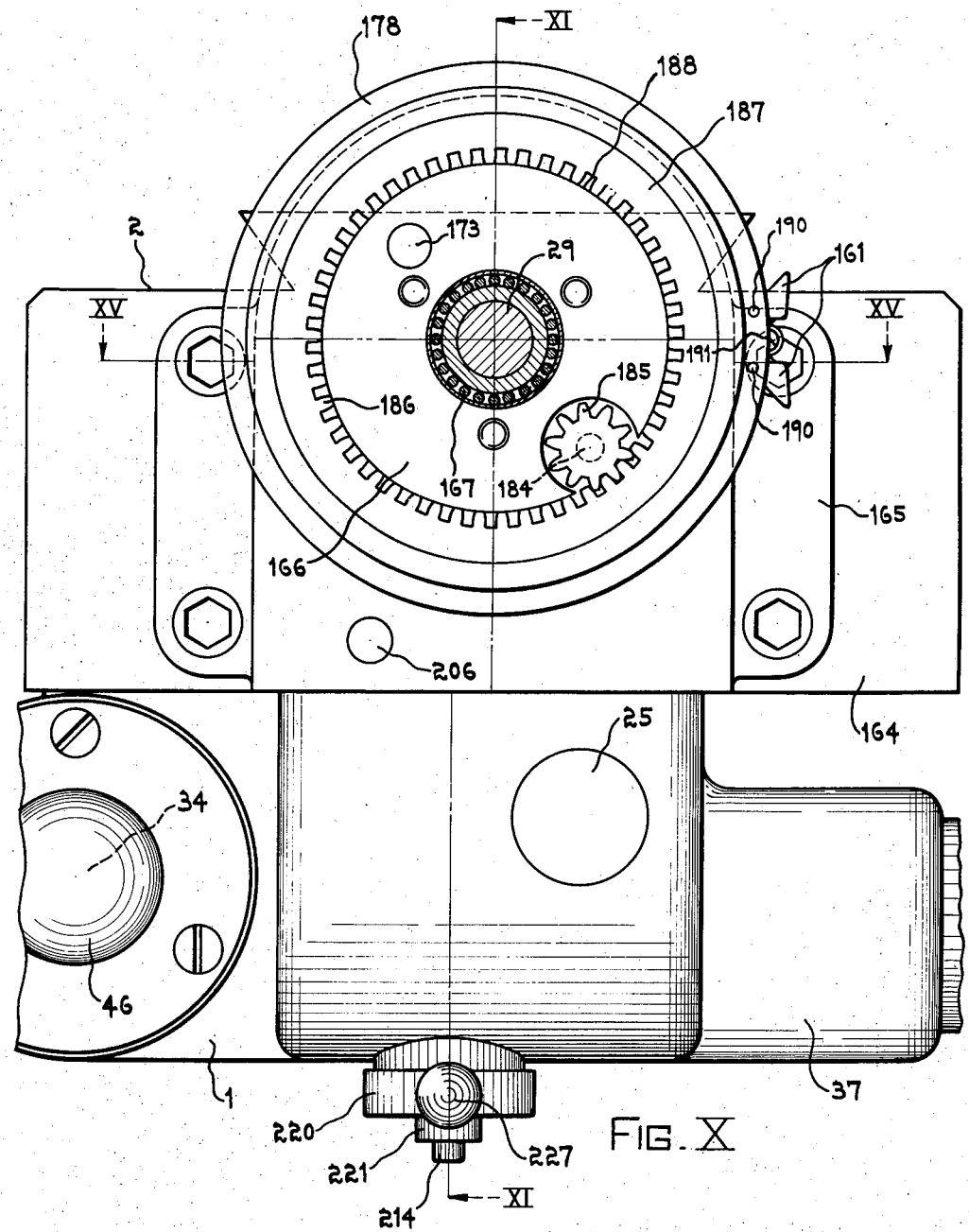

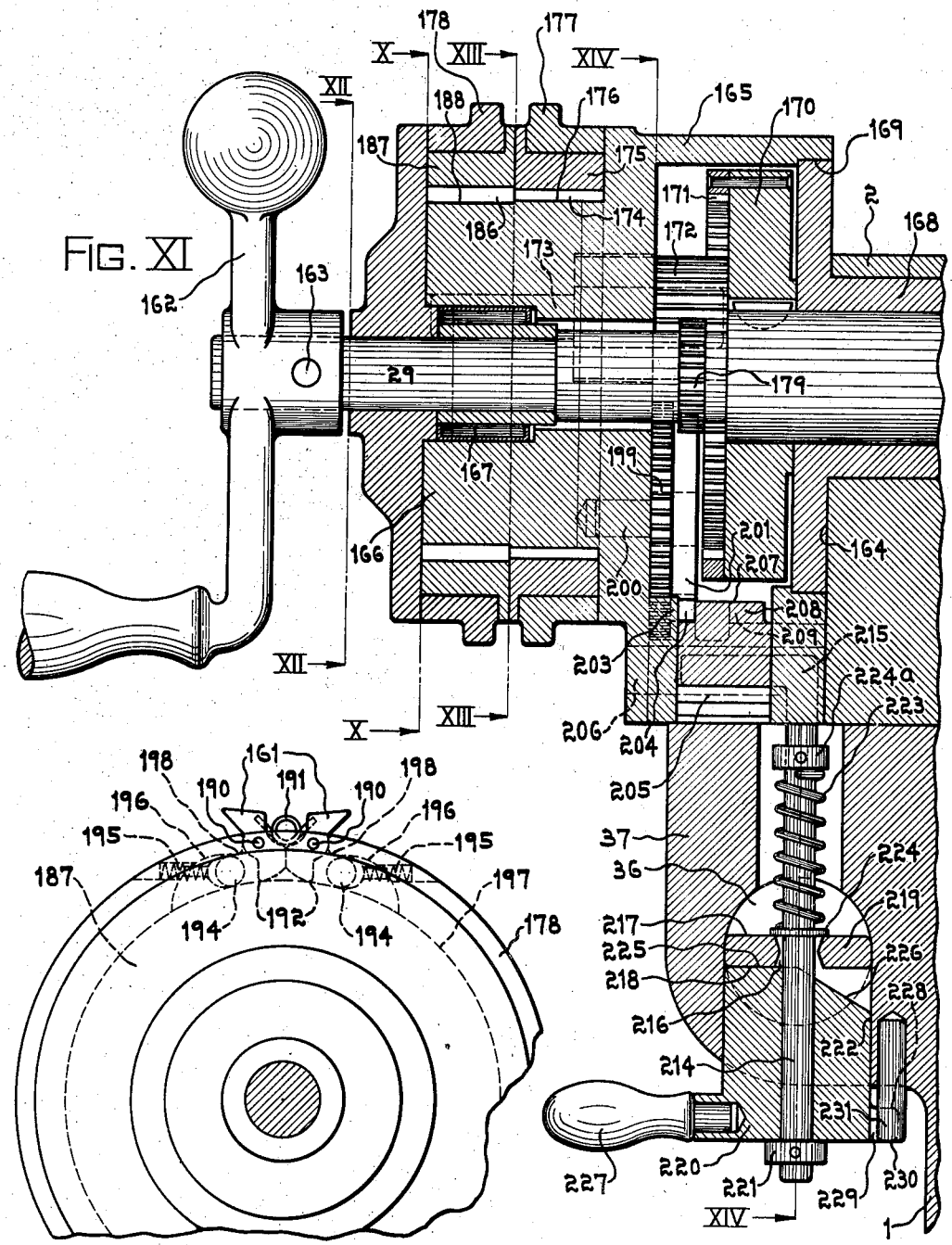

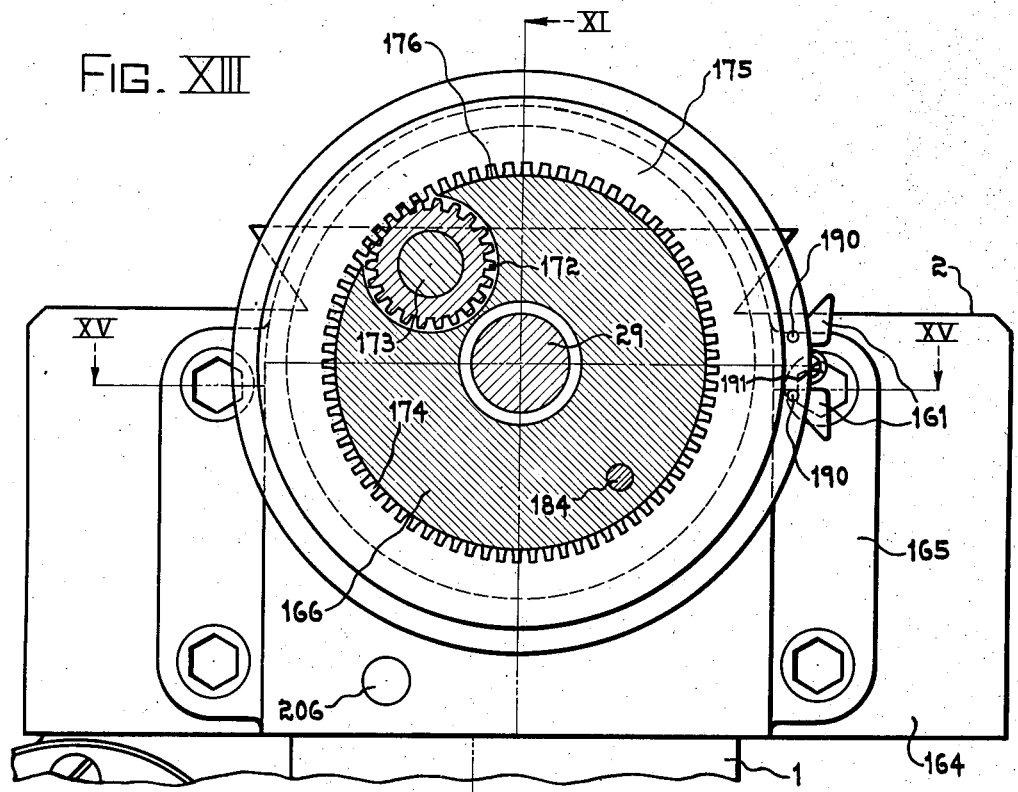
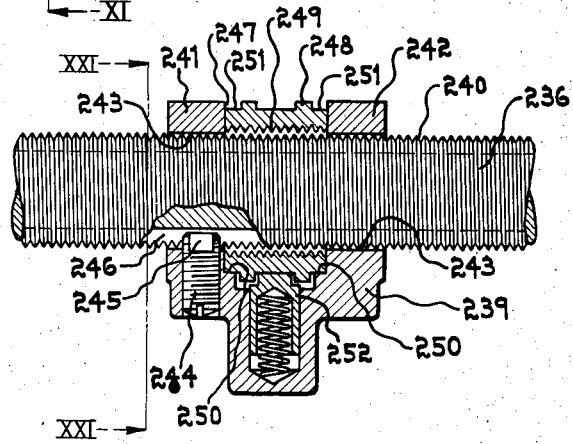

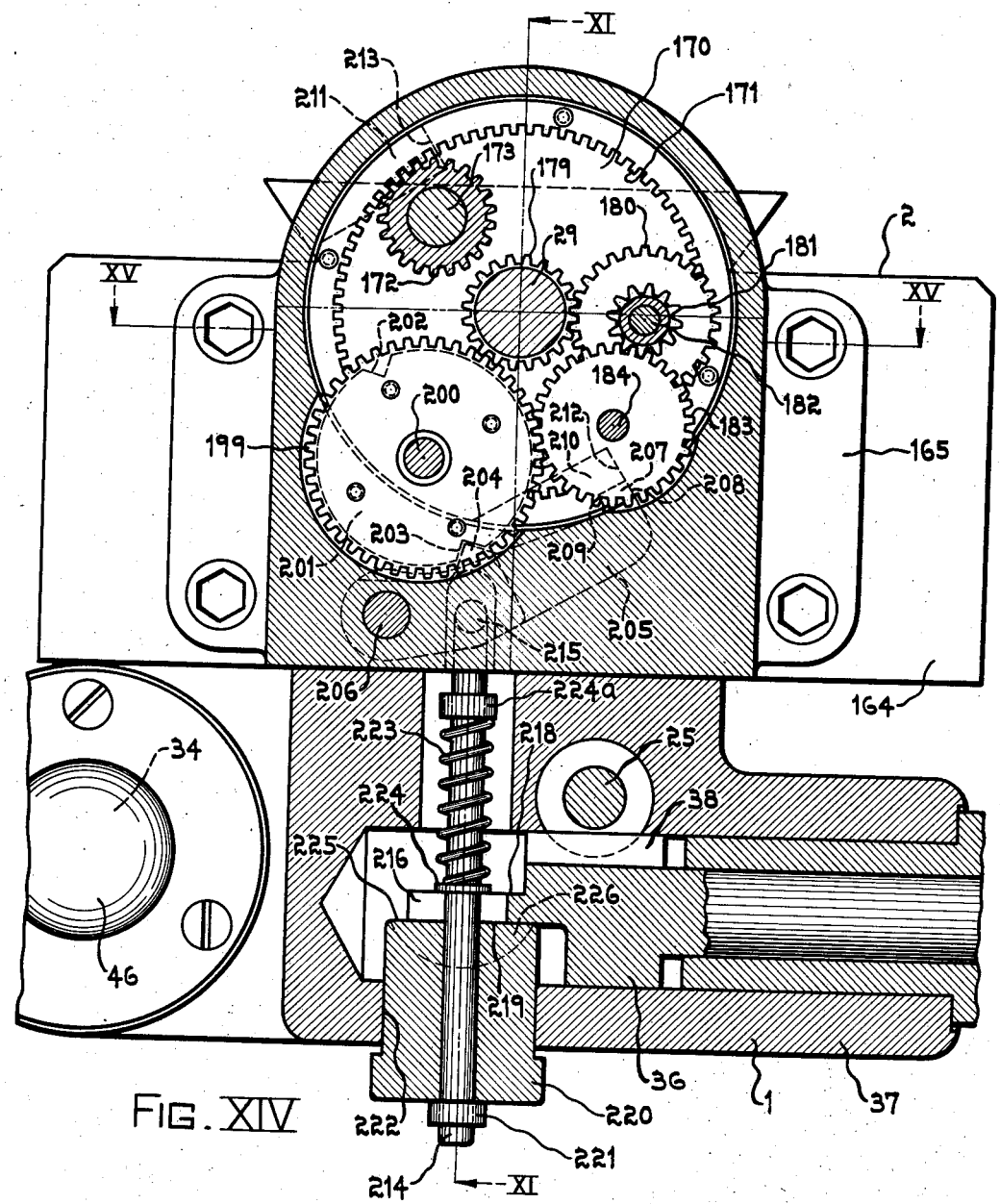

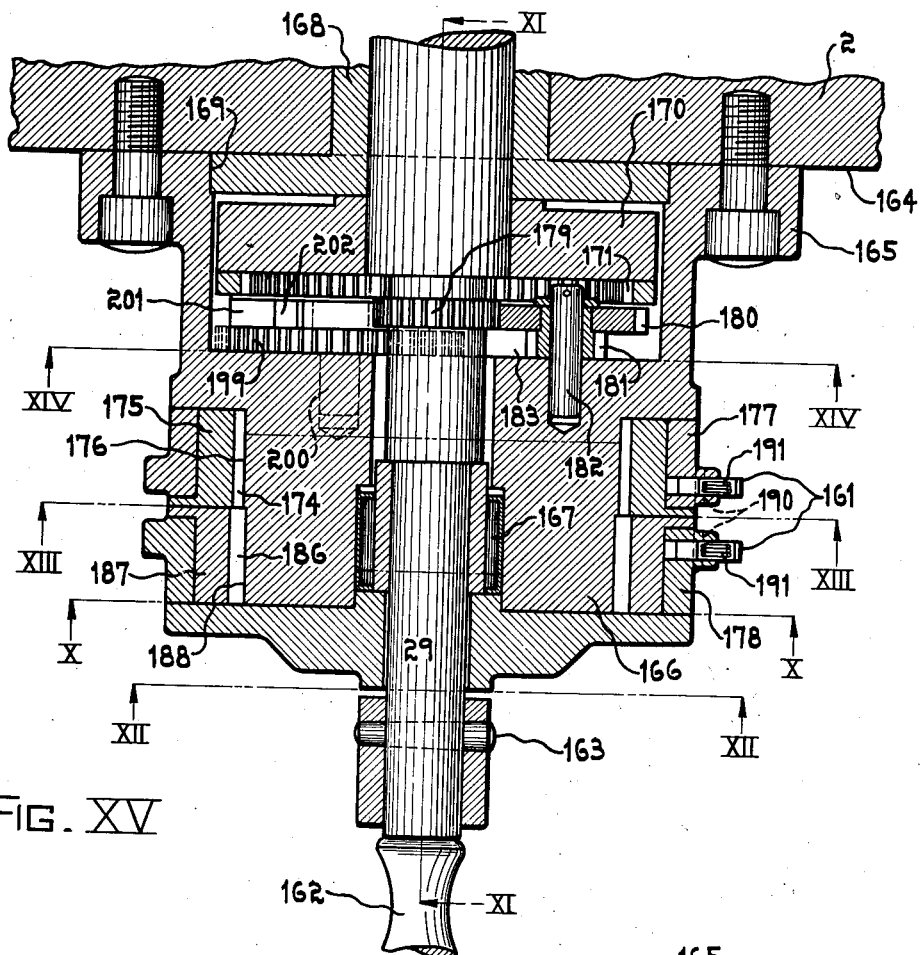
FIG. XV
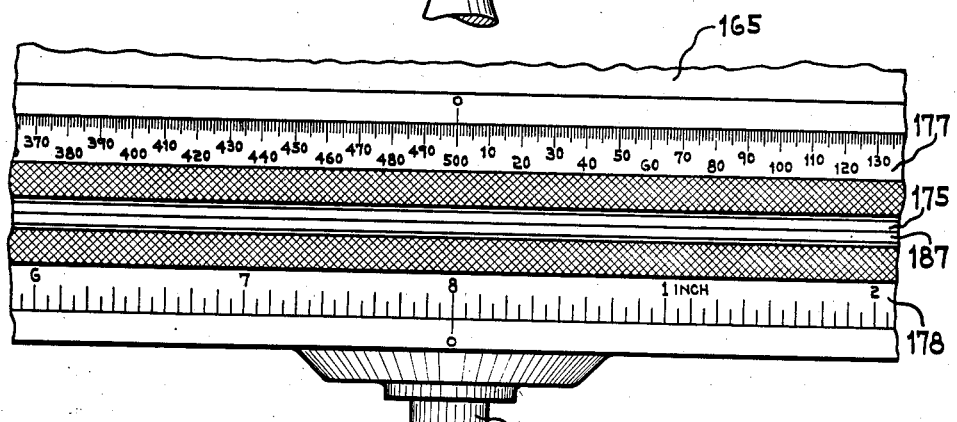
FIG. XVI

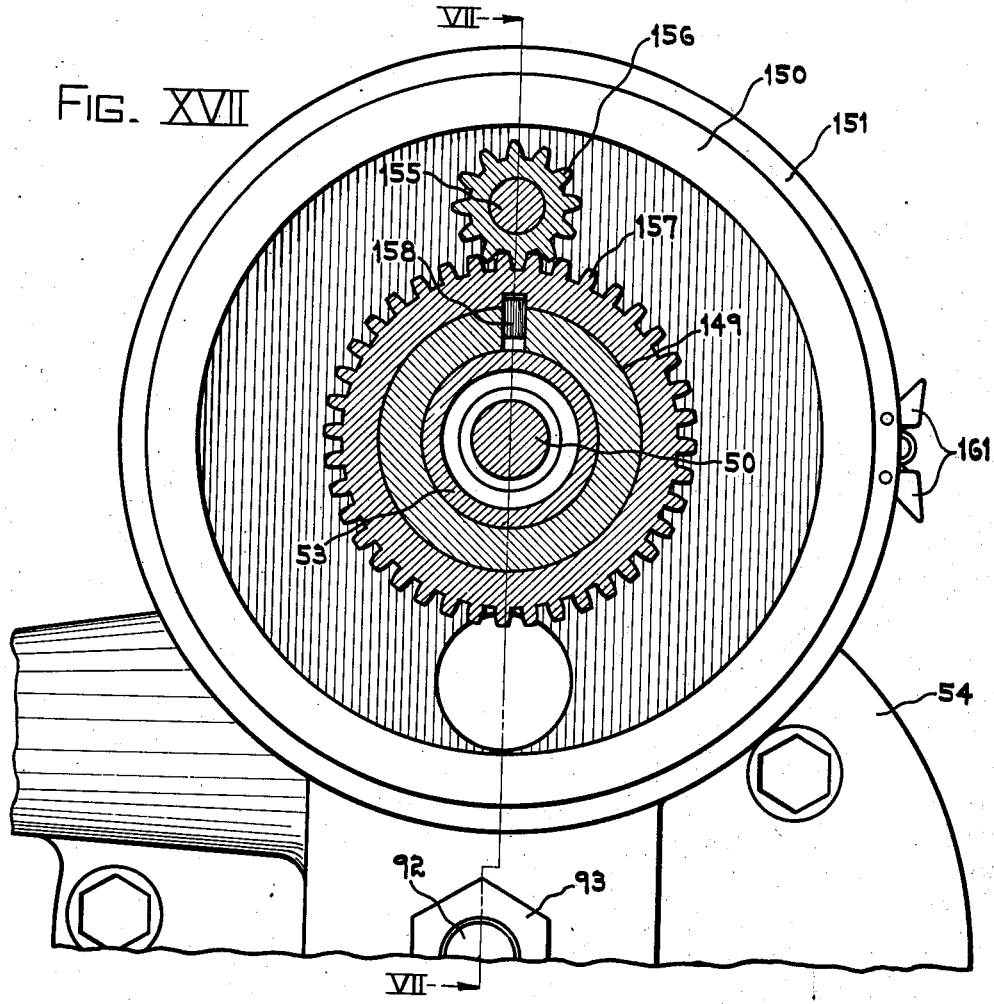
Fig. XVII
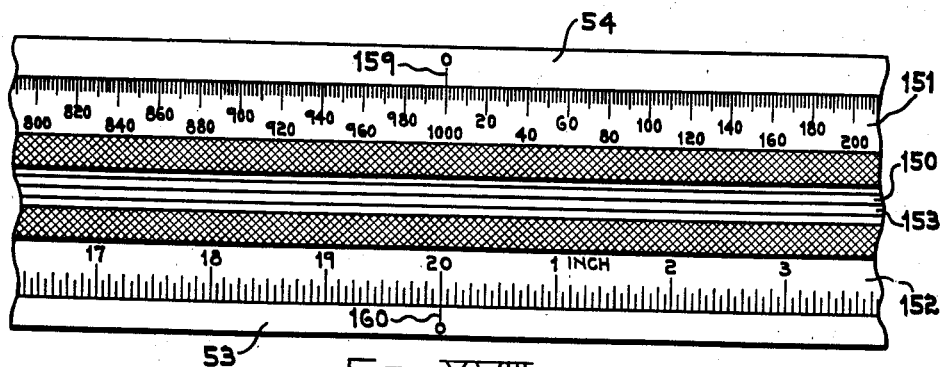
Fig. XVIII

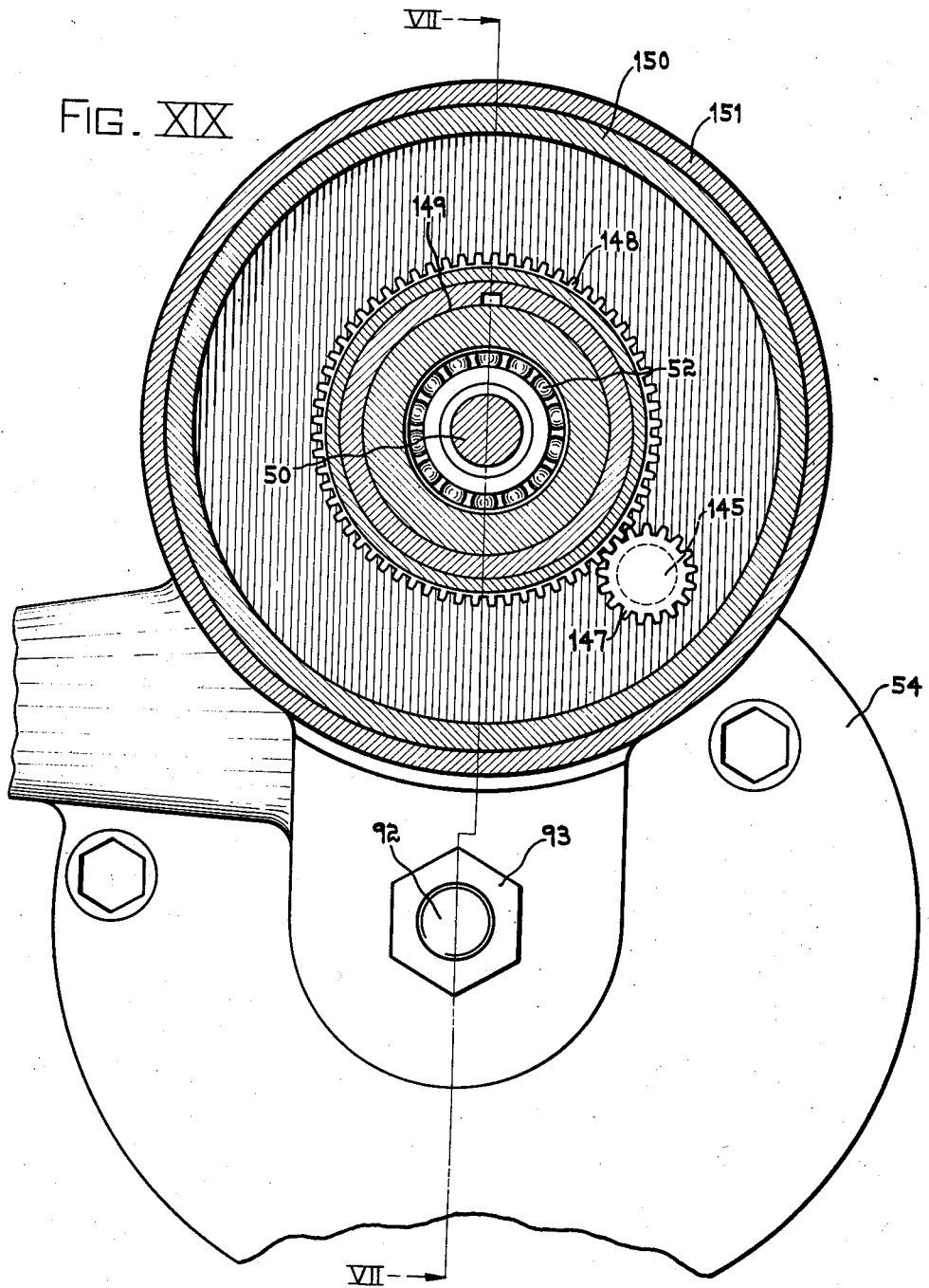

Patented June 6, 1939

2,160,966

UNITED STATES PATENT OFFICE 2,160,966

LATHE APRON MECHANISM

William F. Groene and Harry C. Kemper, Cincinnati, Ohio, assignors to The R. K. Le Blond Machine Tool Company, Cincinnati, Ohio, a corporation of Delaware Application May 23, 1938, Serial No. 209,454

14 Claims. (Cl. 82—22)

This invention pertains to improvements in lathe apron mechanism, more particularly in lathe aprons of a character shown in co-pending application Serial No. 185,562 dated January 18, 1938, and applicable to lathes of the character shown in co-pending application Serial No. 84,500 filed June 10, 1936, and Serial No. 171,670 filed October 29, 1937.

One object of this invention is to improve the sensitiveness and accuracy of control of the rapid traverse mechanism for the longitudinal and cross travel of the lathe carriage and cross slide by improving the various leverages and linkages shown in the earlier application, Serial No. 185,562.

Another object of this invention is to provide means for automatically disengaging the longitudinal feed hand wheel for the carriage actuation when the rapid traverse mechanism is rendered operative in either direction.

Another object is to provide in connection with the longitudinal feed hand wheel, dial indicating mechanisms showing the total distance of travel of the lathe carriage in inches and in thousandths of an inch on a pair of inter-related rotating graduated collars.

Still another object of the invention is to provide means whereby the above mentioned dial mechanism is connected with the longitudinal movement of the carriage and is at all times effective to indicate the amount of said movement whether the carriage be operated manually, by power feeding means, or power rapid traverse actuation.

It is also our intention to provide dial indicating mechanism with the cross feed screw for indicating accurately in inches and in thousandths of an inch the total travel effected in the cross slide.

In connection with the above dial indicating mechanism associated with the cross feed screw, we also provide a unique cross stop arrangement to facilitate thread chasing whereby the cross slide may be withdrawn from a definite cutting position and rapidly returned thereto in making the various passes over the thread being chased in the lathe.

We have also provided a unique arrangement whereby actuation of the cross slide in conjunction with the cross stop mechanism may be effected by means of the rapid traverse operating mechanism or manually in both directions during the thread chasing operation.

We also have in mind in connection with this unique cross stop arrangement means for interlocking the power cross feed mechanism with said cross stop mechanism whereby the latter is rendered inoperative whenever the power cross feed is rendered effective to prevent damage to the cross feed mechanism and the cross stop mechanism in the event the cross feed should accidently be thrown in when the cross stop mechanism was being used.

We also propose to have in conjunction with the above interlocking mechanism of the cross stop and the cross feed mechanism means whereby the cross stop mechanism may be rendered completely inoperative at times when no cross stop mechanism is desired.

It is also our intention to provide a unique setting and locking arrangement in connection with the dial indicating means above mentioned whereby single hand setting operations may be undertaken on these dials with a minimum of effort and skill on the part of the operator on setting them to their desired position.

And it is also a feature of our invention to provide quick set stop dogs on the control rod for the feed reverse mechanism which are actuated by the movement of the carriage and lathe apron along the bed of the lathe whereby a minimum of time is consumed in making these adjustments for reversal of the carriage movement and for accurately determining these reversal positions for the carriage and apron along the lathe bed.

The above features will be described in detail and additional features will be pointed out in the following description.

In the drawings:

Figure I is a front elevation of a lathe apron embodying the features of our invention.

Figure II is a plan view partly in section on the line II—II of Figure I of the apron shown detached from the lathe carriage.

Figure III is a right hand end elevation of the lathe apron on the line III—III of Figures I and II.

Figure IV is a vertical transverse section through the apron on the line IV—IV of Figures I and II.

Figure V is a vertical transverse section through the apron on the line V—V of Figures I, II, and VIII.

Figure VI is a left hand end elevation of the lathe apron on the line VI—VI of Figures I, II, and VIII.

Figure VII is a vertical transverse section through the apron on the line VII—VII of Figures I, II, VIII, and IX.

Figure VIII is an enlarged front elevation of the left hand portion of the apron on the line VIII—VIII of Figures VII and IX, particularly showing the rapid traverse mechanism.

Figure IX is a diagrammatic section through the apron on the line IX—IX of Figure VIII.

Figure X is a vertical section through the cross feed dial on the line X—X of Figures XI and XV.

Figure XI is a vertical section through the apron and carriage on the line XI—XI of Figures X, XIII, XIV, and XV, showing the interlocking mechanism between the cross feed and cross stop apparatus.

Figure XII is a vertical section through the cross feed screw on the line XII—XII of Figures XI and XV, particularly showing the setting clamping arrangement for the graduated collars of the cross and longitudinal feed dials.

Figure XIII is a vertical section through the cross feed dial on the line XIII—XIII of Figures XI and XV.

Figure XIV is a vertical section through the cross feed dial on the line XIV—XIV of Figures XI and XV.

Figure XV is a section through the cross feed dial on the line XV—XV of Figures X, XIII, and XIV.

Figure XVI is a fragmentary diagrammatic view of the periphery of the graduated collars of the cross feed dial.

Figure XVII is a vertical section through the longitudinal feed dial on the line XVII—XVII of Figure VII.

Figure XVIII is a fragmentary diagrammatic view of the periphery of the graduated collars of the longitudinal feed dial.

Figure XIX is a vertical section through the longitudinal feed dial on the line XIX—XIX of Figure VII.

Figure XX is a section through one of the quick-acting stops on the feed reverse control rod on the line XX—XX of Figure XXI.

Figure XXI is a transverse cross section through the feed reverse control rod showing an end elevation of the quick-acting stop on the line XXI—XXI of Figure XX.

This lathe apron is designed to operate with lathes of a character shown in co-pending application Serial Number 84,500 filed June 10, 1936, having feeding mechanism of a character shown in co-pending applications Serial Number 171,760 filed October 29, 1937, and Serial Number 185,562 filed January 18, 1938, particularly as related to the arrangement of the various control rods at the front of the lathe bed.

The apron 1 is bolted to the carriage 2 by suitable screws 3, the carriage 2 in turn being slidably mounted on ways 4 on the bed 48 as is usual for lathes. Referring particularly to Figures I, II, III, and IV, the apron 1 has the usual half-nuts 5 and 6 adapted to engage the lead screw 7 when thread cutting operations are being performed. These half-nuts are operated by the usual scroll cam 8 to which the operating handle 9 is attached, substantially as disclosed in Patent Number 980,971, issued January 10, 1911. Associated with this arrangement is the usual chasing dial 10 mounted on a shaft 11 rotatably journaled in the apron 1 and having a worm wheel 12 engaging in the threads of the lead screw 7 to facilitate proper engagement of the half-nuts with the lead screw when chasing threads.

Mechanism is provided in this lathe apron for operatively connecting either the cross feed mechanism or longitudinal feed mechanism with the driving means of the lathe, of a character substantially as described and claimed in Patent Number 1,944,231, issued January 23, 1934. The driving power for operating the cross and longitudinal feed mechanism is derived from the feed rod 13 which is driven from the main driving motor for the lathe by mechanism, for example, as shown in copending applications Serial Number 84,500 filed June 10, 1936, and Serial Number 171,760 filed October 29, 1937. This mechanism is arranged substantially like that shown in co-pending application Serial Number 185,562 filed January 18, 1938. In a boss 14 formed integral with the apron 1 is rotatably mounted the bevel gear 15, having a splined bore 16 into which the feed rod 13 slidably engages so that the bevel gear 15 may be rotated by the feed rod at all times whether the apron 1 is stationary or is feeding longitudinally.

Noting particularly Figure V, the bevel gear 15 is adapted to drive a mating bevel gear 17 mounted on the shaft 18 journaled, at right angles to the feed rod 13, in suitable bearings 19 and 20 carried in the front wall 21 and rear wall 22 respectively of the apron 1. Intermediate these walls a driving pinion 23 is formed on the shaft 18 and is adapted to drive the shiftable middle gear 24, Figure II, which is securely keyed and pinned to the shifter shaft 25. This shaft is journaled for both axial and rotary movements in suitable bearings 26 and 27 provided in the respective walls 21 and 22 of the apron 1. To the front of the shiftable gear 24 the front outer gear 28 is rotatably journaled on the shifter shaft 25 and is adapted to drive the cross feed screw 29 through the cross feed screw pinion 30 mounted on the cross feed screw 29.

To the rear of the shiftable gear 24 is rotatably journaled on the shifter shaft 25 the rear outer gear 31, which is adapted to drive the gear 32 mounted by slidable splined connection 33 on the rack pinion shaft 34. A feed control handle 35 for selecting and disengaging the cross or longitudinal feed is mounted on the axially slidable rock shaft 36 which is appropriately mounted in the boss 37 formed integral with the apron 1, and has a toothed portion 38, Figures V and XIV, whereby the shifter shaft may be axially moved for engaging the cross or longitudinal feed substantially as disclosed in Patent 1,944,231. Interlocking means 39 between this mechanism and the mechanism for operating the half-nuts is provided substantially as shown in Patent 1,944,231.

The splined rack pinion shaft 34, Figures II and IX, is journaled in a suitable anti-friction bearing 40 in the front wall 21 of the apron and is supported in an anti-friction bearing 41 in the rear wall 22. The inner race of bearing 41 is secured to the shaft 34 by a suitable nut 42 which holds the bearing firmly against the integral rack pinion 43 formed on the shaft 34. The outer race of the anti-friction bearing 41 is adapted for axial movement in the bore 44 in the rear wall 22 and in a mating bore 45 in the gear 32. The shaft 34 is also adapted for axial movement in the bearing 40. A pull knob 46 is fixed to the front end of the shaft 34 to facilitate manual movement of the rack pinion shaft axially. The purpose of this is to enable the operator of the lathe to withdraw the rack pinion 43 from the rack 47 fixed to the bed 48 when using the leadscrew and half nuts in thread chasing when it is desired to avoid driving the various gear trains of the apron through the rack 47 and pinion 43 when the apron is being moved by the lead screw 7 to prevent inaccuracies in the thread chasing and excessive wear of the lead screw and half nuts.

The hand wheel 49 for manual longitudinal feeding of the carriage is fixed on shaft 50, Figures VII and IX, which shaft is supported through the hub 51 of the hand wheel 49 on the antifriction bearing 52 which in turn is carried by the cover plate 53 attached to the bracket 54 mounted on the front wall 21 of the apron 1. Mounted on bearings 55 and 56 in the front and rear walls 21 and 22 of the apron 1, coaxial with the shaft 50, is the shaft 57 having an integral pinion 58 formed thereon which meshes with the gear 32, so that rotation of the shaft 57 will cause the rack pinion 43 to be rotated to move the carriage longitudinally.

Means are provided, Figures VII and IX, for connecting or disconnecting the handwheel 49 from the shaft 57 comprising a clutch collar 59 which is axially slidable on the splined inner end 60 of the shaft 50, the collar 59 being adapted to be moved toward the shaft 57 to engage the mating splined end 61 of the shaft 57 whereby the shaft 57 may be rotated by the hand wheel 49 and may be disconnected therefrom when moved away from the shaft 57 as shown in Figures VII and IX.

Mechanism for providing power rapid traverse for the carriage and cross slide in either direction with a single lever control of a character shown in application Serial Number 185,562 filed January 18, 1938 is provided in this apron. The main source of driving power for the apron rapid traverse mechanism is derived from the rapid traverse rod 62 which is driven at constant speed at all times during the operation of the lathe.

In the boss 64, Figure IX, is journaled the bevel gear 65 on suitable bearings 66 adapted to prevent axial movement of the bevel gear 65. The bevel gear 65 has a splined bore into which the rapid traverse rod 62 slidingly engages, so that the bevel gear 65 may be rotated by the rapid traverse rod 62 at all times whether the apron is stationary or is feeding longitudinally. A mating bevel gear 67, adapted to be driven by the bevel gear 65, is formed integral with the shaft 68 which is journaled perpendicular to the rapid traverse rod 62 in suitable anti-friction bearings 69 and 70 which bearings in turn are mounted in the sleeve 71 secured in the rear wall 22 of the apron 1. Mounted on the inner end of the shaft 68 and secured and held in driving relation thereon by the key 72 and lock nut 73 is a gear 74 adapted to engage and drive the gear 75 of the double gear 76, the compound gear being rotatably journaled on the shaft 77 fixed in the front wall 21 and rear wall 22 of the apron 1. The gear 75 also engages the gear 78 of the compound gear 79 which is journaled on the shaft 80 fixed in the front wall 21 and rear wall 22 of the apron 1.

The traverse reverse and forward friction clutch assemblies are mounted on the shaft 81 which is journaled in the anti-friction bearing 82 mounted in the rear wall 22 and in the anti-friction bearing 83 slidably mounted in the bracket 54 on the front wall of the apron 1. The portion of the shaft 81 intermediate these bearings is provided with splines 84 upon which are mounted the clutch assemblies comprising the discs 85 and the gear 86 fitting in driving relation but adapted to axial movement on the splines 84. Rotatably journaled on the hubs 87 of the middle discs 85 are the driving disc gears 88 and 88a to which are fixed appropriate composition friction material 89 adapted for frictional engagement with the discs 85 and the side face of the gear 86. Between these clutch assemblies is mounted the clutch operating member comprising the self aligning ball bearing 90 having its inner race slidingly mounted on the periphery of the shaft 81. The clutch assemblies and operating member are properly confined on the shaft 81 between the inner races of the bearings 82 and 83 by the adjustable bearing retainer 91 which engages the outer race of the bearing 83 and which may be easily adjusted for properly setting the relative position of the clutch plates for proper driving engagement by manipulating the adjusting screw 92 and lock nut 93. It can thus be seen that as the clutch operating member 90 is urged axially toward the rear of the apron, the normally loose running disc gears 88 will be clamped between the associated discs 85 in driving engagement with the shaft 81. Likewise the disc gears 88a may be engaged in driving relation with the shaft 81 when member 90 is urged to the front of the apron 1.

The disc gears 88 are driven from the compound gear 79 by means of the gear 94; and the disc gears 88a are driven from the compound gear 76 by means of gear 95. It can therefore be seen that since the shaft 68 rotates at constant speed, in the same direction by the means described, rotation of the disc gears 88 will therefore be produced through the gears 74, 75, 78 and 94, while rotation of the disc gears 88a will be produced through the gears 74, 75, and 95. It thus follows that the disc gears 88 and 88a rotate in opposite directions and that by alternately engaging one or the other clutch assemblies by the appropriate axial movement of the member 90, corresponding directions of rotation in either direction can be produced in the shaft 81 and the gear 86.

The mechanism for alternately connecting the above forward and reverse rapid traverse driving power to the longitudinal and cross travel of the carriage and cross slide comprises the gear 86 which is adapted for driving engagement with the axially slidable clutch gear 96 journaled for free rotation on the shaft 57, Figures VII and IX. When shifted axially toward the front of the apron 1, the gear 96, which is at all times in driving engagement with the gear 86, meshes with a gear 97 of the compound gear 98 which compound gear is journaled for free rotation upon a suitable extension 99 of the hub of the gear 32. The gear 100 of the compound gear 98 in turn is connected in driving relation with the gear 28, Figure II, which drives the cross feed mechanism as described.

The gear 96 has an internal clutch 101 adapted to engage over a portion 102 of the pinion 58 whereby to provide a positive driving connection between the gear 96 and the pinion 58 so as to impart longitudinal rapid traverse movements to the carriage through the gear 32 and rack pinion 43 as described. It can thus be seen from the above description that the gear 96 can be caused to rotate at rapid traverse speeds in either direction, through the forward and reverse clutch assemblies described, and that when the gear 96 is shifted toward the front of the apron, rapid traverse may be applied in either direction to the cross slide and when the gear 96 is shifted toward the rear of the apron, rapid traverse may be provided to longitudinal movement of the carriage in either direction.

A single lever control mechanism of a character shown in application Serial Number 185,562 filed January 18, 1938, has been provided for alternately applying rapid traverse motions in either direction to the longitudinal and cross travel of the carriage and cross slide and in addition mechanism whereby the hand wheel is automatically disengaged from the apron transmission when the rapid traverse control lever is actuated, particularly to prevent spinning of the carriage actuating hand wheel when longitudinal rapid traverse movements are being affected. Referring to Figures I, II, VI, and VIII, the rapid traverse control lever 103 is conveniently located on the left hand end of the apron 1 directly to the left of the handwheel 49. In the bore 104 in the apron 1 is journaled the rock shaft 105 against axial movement. On the left hand end of the rock shaft 105 is provided a bifurcated portion 106 having a transverse slot formed therein by the faces 107, 108, and 109. The control handle 103 has a squared portion 110 which is adopted to fit nicely between the faces 107 and 109 and is pivotally mounted on the pin 111 passing diametrically through the bifurcated portion 106 perpendicular to the faces 107 and 109. The purpose of this arrangement is to permit horizontal movement of the handle 103 substantially parallel to the axis of the rock shaft 105. It is also to be noted that the handle 103 may be moved up and down in a vertical plane as it is confined between the faces 107 and 109. This causes rotation of the rock shaft 105 in the bore 104 in the apron 1.

Formed integral with the squared end portion 110 of the handle 103 is an arm 112 projecting to the right through the central opening 113 in the rock shaft 105 and engaging with its rounded outer end 114 a slot 115 in the shifter rod 116 upon which is fixed the shifter yoke 117 adapted to engage and shift the gear 96 and its clutch 101 for cross or longitudinal rapid traverse when the lever 103 is accordingly moved to the left or right in horizontal movement as described. Suitable detent mechanism 118 is provided to facilitate holding the handle 103 in either of the horizontal positions selected.

The engagement of the rapid traverse clutch assemblies is affected by up and down movement of the handle 103 by providing a gear segment 119 on the right hand end of the rock shaft 105 which engages rack teeth 120 on the top of a horizontally slidable pin 121 carried in the apron 1 on the under side of which pin is formed rack teeth 122 which mesh with the gear segment 123 formed on the lever arm 124 of the clutch actuating yoke 125. This yoke 125 is pivotally mounted on a trunnion 126 in a suitable bearing 127 provided in the apron 1 and on a pin 128 fixed in a bore 129 in the apron 1 and has an arcuate slot 130 nicely fitting about the outer race of the self-aligning bearing 90 so that when the lever 103 is moved up or down tilting motion will be produced in the yoke 125 and through the self-aligning bearing 90 will cause its inner race to effect operation of one or the other of the clutch assemblies for traverse movements in either direction. By the use of this particular arrangement of leverage in conjunction with the self-aligning ball bearing 90 an unusually efficient and sensitive control of these rapid traverse motions may be obtained with a minimum of effort and skill required on the part of the operator in manipulating the handle 103.

Associated with the lever 103 is mechanism for automatically disengaging the longitudinal feed hand wheel 49 from the apron transmission whenever the rapid traverse lever is actuated to any rapid traverse position. Noting particularly Figures I, VI, VII, and VIII, on a rock shaft 131 journaled in the boss 132 of the bracket 54 is fixed the lever 133 which has a tension spring 134 attached to its outer end and also to the projecting end 135 of the pin 128 whereby the lever 133 is normally resiliently urged in a counter-clockwise direction, Figure VI, by the spring 134. Formed integral with the bifurcated end 106 of the rock shaft 105 is the depending arm 136 in the lower bifurcated end of which is mounted the roller 137 on the pin 138 fixed therein. In the lever 133 is formed a detent notch 139 in which the roller 137 enters when the lever 103 is in neutral position and the rapid traverse clutch assemblies inoperative thus allowing the maximum counter-clockwise movement of the lever 133 and the rock shaft 131. When the lever 103 is actuated up and down to render said rapid traverse clutch assemblies operative as described the roller engages the surfaces 140 or 141 which causes the lever 133 and rock shaft 131 to be rotated in a clockwise direction. To the inner end of the rock shaft 131 is fixed the shifter yoke 142 which engages the clutch collar 59 so that counter-clockwise rotation of the rock shaft 131 swings the yoke 142 to engage the clutch collar 59 with the shaft 57 to connect the hand wheel 49 with the apron transmission, this being affected when the roller 137 enters the detent slot 139 as shown in Figure VI. When the lever 103 is moved up or down from the position shown in Figure VI, the roller rides along either of the surfaces 140 or 141 swinging the yoke 142 clockwise, Figure VII, disengaging the clutch collar 59 from the shaft 57 and thus automatically disconnecting the hand wheel 49 from the apron transmission whenever the lever 103 is moved to an operative position.

Associated with the longitudinal feed hand wheel is a direct reading indicating dial arrangement which is effective at all times to show the exact amount of longitudinal travel of the carriage both in feeding or rapid traversing movements and irrespective as to whether the longitudinal feed hand wheel is connected or disconnected from the apron transmission. This mechanism is best shown in Figures VII, IX, XVII, XVIII, and XIX. A gear 143 fixed to the shaft 57 drives a gear 144 fixed on the shaft 145 appropriately journaled on needle bearings 146 in the bracket 54. Formed integral with the shaft 145 is a gear 147 of the same pitch and number of teeth as the gear 144 which engages and drives the ring gear 148 journaled on the hub 149 of the bracket 54. Fixed to the ring gear 148 is the dial disc 150 upon the periphery of which is adjustably mounted the graduated "thousandth" collar 151 which is graduated as shown in Figure XVIII with divisions to show two thousandths of an inch carriage travel along the bed, one complete revolution of the collar 151 indicating one thousand thousandths on one inch of carriage travel. The rack pinion 43 and the associated gears 32, 58, 143, and 148, gears 144 and 147 acting as idlers, are so proportioned as to cause the collar 151 to make one complete revolution for one inch of travel of the rack pinion 43 along the rack 47 on the bed 48. Thus the collar 151 accurately indicates the exact amount of carriage travel in thousandths of an inch.

In order to indicate the number of revolutions of the collar 151 or the number of inches traveled by the carriage along the bed a graduated "inch" collar 152 is provided which is graduated from zero to twenty inches by sixteenths of an inch.

This collar 152 directly indicates the total carriage travel (up to twenty inches in this case) while the collar 151 indicates precisely the exact fractional part of the inches traveled. This collar is adjustably mounted on the dial disc 153 which in turn is fixed to the ring gear 154 journaled on the hub 149 of the bracket 54. On a stud 155 fixed in the dial disc 150 is rotatably mounted a pinion 156 which meshes with and is carried around the ring gear 157 fixed on the hub 149 by the pin 158 by rotation of the dial disc 150 to thus cause rotation of the pinion 156 on its stud 155. This pinion 156 is also in mesh with the rotatable ring gear 154 which is caused to rotate on the hub 149 as the dial disc 150 is rotated by the carriage movement. The ring gear 154 and 157 have the same pitch diameters but have different numbers of teeth so as to produce the necessary differential in the rate of rotation of the dial discs 150 and 153. In this instance the number of teeth for these gears is so selected as to cause the dial disc 150 to rotate twenty times to one revolution of the dial disc 153 thus producing the proper movements for the graduated collars shown in Figure XVIII.

A unique feature in connection with this longitudinal dial arrangement is that it is at all times connected directly to the apron transmission and not to the longitudinal feed hand wheel 49. Thus all movement imparted to the carriage, be it caused by hand feeding through the hand wheel 49, power feeding from the feed rod 13, or rapid traverse movement from the rapid traverse rod 62 when the hand wheel 49 is inoperative, is accurately indicated by the dial mechanism.

Each of the graduated collars 151 and 152 are adjustably mounted on the peripheries of their respective dial discs 150 and 153 so that they may be set to the respective zero marks 159 and 160 on the bracket 54 and cover plate 53 for beginning a cutting operation. In order to facilitate setting these graduated collars on the dial discs an automatic locking device of a character shown in Figure XII is utilized. This mechanism is shown generally at 161 and is identical with that used in connection with dial mechanism for the cross feed screw. It will therefore not be described in detail here as this will be described in detail in connection with the cross feed dial mechanism to follow.

The cross feed screw 29 may be driven by power as described from the gear 28 driving its pinion 30 or it may be rotated manually by means of the cross feed screw ball crank handle 162 which is fixed to the cross feed screw 29 by means of a suitable pin 163. Bolted to the front face 164 of the carriage 2 is a bracket 165, Figures X, XI, XIII, and XV, having a hub portion 166 in which is carried a needle bearing 167 for supporting the outer end of the cross feed screw 29, the inward portion of the screw being supported in the bushing 168 in the carriage which also serves as a guide in the counterbore 169 for locating the bracket 165 on the carriage.

The dial indicating mechanism associated with the cross feed screw is best shown in Figures X, XI, XIII, XIV, and XV, and comprises the abutment disc 170 which is fixed on the cross feed screw 29 and which has riveted to its front face an internal ring gear 171. This ring gear 171 drives an idler pinion 172 mounted on a stud 173 fixed in the boss 166 of the bracket 165, this idler gear 172 in turn drives the internal gear 174 formed in the dial ring 175. This dial ring 175 is journaled on the tops of the teeth of the internal gear 174 on the bearing surface 176 formed on the boss 166 of the bracket 165. The internal gear 174 has the same pitch and number of teeth as the internal gear 171 so that it rotates in synchronism therewith and with the screw 29. The graduated "thousandths" collar 177 is adjustably mounted on the periphery of the dial ring 175 and is graduated for thousandths of an inch as shown in Figure XVI and gives direct readings in thousandths of an inch of the cross slide movement as the cross feed screw is rotated, two revolutions of the collar 177 indicating one inch of cross slide travel.

The graduated "inch" collar 178 which in this case is graduated from zero to eight inches by sixteenths of an inch, is rotated at one sixteenth the speed of the graduated collar 178 by the mechanism as follows: On the cross feed screw 29 is formed a gear 179 which drives the large gear 180 of the compound gear 180-181 journaled on the pin 182 fixed in the bracket 165. The pinion 181 attached to the gear 180 in turn drives the gear 183 fixed on the shaft 184 journaled in the bracket 165. Fixed on the shaft 184, Figure X, is a pinion 185 which drives the internal gear 186 formed integral with the dial ring 187 upon the periphery of which is adjustably mounted the "inch" graduated collar 178, the dial ring 187 being rotatably journaled on the tops of the teeth of the internal gear 186 on the bearing surface 188 formed on the boss 166 of the bracket 165. Since the graduated collar 177 requires two revolutions to indicate one inch of cross slide travel the graduated collar 178 one sixteenth of a revolution for every revolution of the collar 177. This is accomplished by providing a gear reduction of sixteen to one through the gears 179 to 180, 181 to 183, and 184 to 185 in the specific illustrative embodiment shown here.

All of the graduated collars of both the longitudinal and cross feeding mechanism are adjustable relative to their rotating members upon which they are carried and may be locked in adjusted positions by the mechanism 161 shown in Figure XII applied to the graduated collar 178 and the associated dial disc 187 as being a typical illustration applicable to all of said collars. A pair of pinchers 161 are pivotally mounted on pins 190 fixed in the graduated collar 178 and are normally urged apart by the twist spring 191. The inner ends 192 of the pinchers are adapted when squeezed to swing into engagement with the clutch rollers 194 to force them back against the compression springs 195 carried in the collar 178 and into the clearance space between the surface 196 of the collar 178 and the periphery 197 of the dial ring 187. When the pinchers 161 are so held the collar 178 may be freely rotated on the dial ring 187 with one hand to any desired position. When the pinchers 161 are released after the selected position has been found the spring 191 releases the ends 192 from the rollers 194 allowing the springs 195 to automatically wedge these rollers between the periphery 197 of the dial ring 187 and the surfaces 198 of the graduated collar 178 to thereby automatically lock the collar on the dial ring against rotation in either direction. By this arrangement a single hand control arrangement is provided for setting of these graduated collars.

Associated with the cross feed screw 29 and the dial indicating mechanism described above is an automatic cross stop arrangement providing limited movement for the cross slide when chasing threads. This cross stop mechanism is interlocked with the power cross feed mechanism of the lathe apron and is operable by the power rapid traverse mechanism of the apron. Noting particularly Figures XI, XIV, and XV, the gear 183 is driven by the gear 179 as described, the gear 183 in turn driving the detent gear 199 rotatably mounted on the stud 200 fixed in bracket 165. Fixed to the gear 199 is the detent disc 201 having notches 202 and 203 adapted to engage the projection 204 of the abutment lever 205 which is pivotally mounted on a pin 206 fixed in the bracket 165. On the outer end of the abutment lever 205 is formed a projection 207 having abutment faces 208 and 209. In the abutment disc 170 are formed notches 210 and 211 having the respective abutment faces 212 and 213 adapted to respectively engage the abutment faces 208 and 209 of the lever 205 when the lever 205 is swung counter-clockwise, Figure XIV, toward the axis of rotation of the disc 170. The lever 205 can swing in this counter-clockwise direction to enter either of the notches 210 or 211 of the disc 170 only when its projection 204 enters either of the notches 202 or 203 in the detent disc 201. Engagement of the abutment face 208 of the disc 170 with the abutment face 212 of the lever 205 arrests the inward rotation of the cross feed screw 29 and the inward travel of the cross slide; engagement of the abutment face 209 with the abutment face 213 of the lever 205 arrests the outward rotation of the cross feed screw 29 and the outward travel of the cross slide. It is found necessary, in order to provide sufficient travel for withdrawing the cross slide from operating position to clear all depths of thread which might be chased on such a lathe arrangement, to allow several revolutions of the cross feed screw between the inward and outward stop positions for the cross slide as effected by the notches 210 and 211 of the disc 170. This is accomplished by appropriately arranging the gear ratios through the gears 179 to 180, and 181 to 199, (gear 183 being an idler gear in this train) so that the projection 204 may enter notch 203 in the idler disc 201 when the projection 207 enters the notch 210 but that the disc 170 or the cross feed screw 29 must be rotated several revolutions (counter-clockwise Figure XIV) before the notch 211 is positioned for entry of the projection 207 of the lever 205 simultaneously with the entrance of the projection 204 in the notch 202 of the detent disc 201. In using this cross stop mechanism the cross feed screw may be rotated by hand by means of the ball crank handle 162 or it may be rotated by the rapid traverse mechanism by appropriately manipulating the rapid traverse handle 103 to effect rapid traverse movements of the cross slide which movements are accurately limited by the cross stop mechanism as described. No damage results to the apron transmission when the cross top abutments engage since the rapid traverse clutch assemblies are arranged to have just sufficient driving action to effect the rapid traverse movements but to slip where a positive abutment is engaged by the traversing member.

Mechanism is provided for automatically rendering the cross stop mechanism inoperative when power cross feeding movement is imparted to the cross slide. In conjunction with this arrangement is also provided manual means for rendering this cross stop mechanism completely inoperative as desired when manually actuating the cross feed screw. This is best shown in Figures XI and XIV and comprises a vertical rod 214 having a horizontal projection 215 on its upper end pivotally mounted in the abutment lever 205 and extending downwardly through a slot 216 formed perpendicular to the faces 217 and 218 of the flatted end portion 219 of the rock shaft 36. The rod 214 also passes through cam member 220 and has a collar 221 fixed on its lower end to prevent the member 220, which is free to rotate on the rod 214 and in the bore 222 in the apron 1, from dropping off of said rod. A compression spring 223 bearing against a washer 224 resting on the surface 217 of the rock shaft 36 and against the collar 224a fixed on the rod 214 serves to normally hold the surface 225 of the cam member 220 against the surface 218 of the rock shaft 36 which also allows the abutment lever 205 to operate with the control of the notches in the discs 170 and 201 of the cross stop mechanism, the rod 214 being forced downwardly compressing the spring 223 when these notches are not in position to receive the projections 204 and 207 on the abutment lever 205.

When the rock shaft 36 is rotated counter-clockwise, Figure XI, by pushing down on the feed control handle 35 the cross feed power for rotating the cross feed screw 29 is engaged in a manner fully disclosed in Patent 1,944,231 cited above. In order to prevent damage to the cross stop mechanism the abutment lever 205 is withdrawn from operative position by the surface 218 of the rock shaft 36 which presses the cam member 220 downwardly thus drawing the rod 214 downwardly to rotate the lever 205 clockwise, Figure XIV, to inoperative position. The cam member 220 has a cut-a-way face 226 which is not acted upon by the surface 218 of the rock shaft 36 when rotated by raising the feed control handle 35 for longitudinal feeding of the carriage as obviously no damage to the cross stop mechanism would result in this instance. The cross stop mechanism is, of course, operative when the feed control handle 35 is in neutral position as shown in Figure XI.

The cross stop mechanism may also be rendered operative or inoperative manually by means of the cross stop control handle 227 which is fixed in the cam member 220 for rotating and axially sliding said member. By pressing down on the handle 227 and rotating the cam member 220 until the surface 228 of its integral lug 229 engages under the end 230 of the pin 231 the abutment lever 205 may be permanently held in inoperative position when the cross stop mechanism is not wanted, as when feeding the cross feed screw by hand. Merely rotating the cam member 220 by the control handle 227 until the surface 228 rides off the pin 231 will reposition the cross feed mechanism in operative condition and subject to the automatic control of the cross feed control handle 35 as described.

The rotation of the lead screw 7 and the feed rod 13 may be started or stopped and reversed by the control handle 232 pivotally mounted on the pin 233 fixed in the apron 1. This lever 232 is connected through the link 234 and the lever 235 carried by the apron 1 and slidingly keyed to the control rod 236 is adapted to combine axial and rotary movements for controlling reversing gear in the headstock of the lathe in the usual manner for example as is shown in Patents 1,938,906 dated December 12, 1936, and 1,982,612 dated November 27, 1934, and also as shown in applications Serial Number 84,500 filed June 10, 1936, and Serial Number 185,562 filed January 18, 1939.

The control rod 236 may also be actuated by the movement of the carriage 2 along the bed 48 by engagement of the faces 237 and 238 of the apron 1 with the quick-set actuating dogs 239 carried on the control rod 236. The construction of these unique dogs 239 is shown best in Figures XX and XXI. The control rod 236 is provided with threads 240 upon which is slidably carried the dog 239 having spaced integral annular portions 241 and 242 having bores 243 nicely fitting on the tops of said threads. A threaded pin 244 carried in the dog 239 and having its end 245 slidingly engaging the keyway 246 in the control rod 236 serves to prevent rotation of the dog 239 about the control rod 236. Between the faces 247 of the portion 241 and 242 is nicely fitted the adjusting and stop collar 248 which has an internal thread 249 of the same number of threads per inch as the threads 240 on the control rod 236 but having a bore of greater diameter than the outside diameter of the control rod 236 so that when the collar is positioned with its bore coaxial with the rod 236 the dog 239 may be rapidly slid along said rod to any desired position. In order to facilitate finding said coaxial position for the collar 248, arcuate surfaces 250 are formed in the dog 239 concentric with the bores 243, and thus the control rod 236, which engage appropriate surfaces 251 on the collar 248 when it is held manually into said arcuate surfaces, as shown in Figure XX. In order to provide a means to automatically engage the collar 248 with the threads 240 for positively locking the dog to the control rod and under which conditions the dog may be accurately adjusted along the rod by rotating the collar 248 a spring urged plunger 252 is provided for normally forcing the collar out from the surfaces 250.

A control lever 253 fixed on the rock shaft 254 journaled in the carriage 2 and connected by a suitable link 255 and lever 256 for rocking the spindle control rod 257 provides means associated with the apron control handles for starting, stopping and reversing the spindle rotating of the lathe in the usual manner.

Having thus fully set forth and described our invention, what we claim is:

1. In a lathe, an apron, means in said apron for effecting rapid traverse movements in the carriage and cross slide in either direction, a single control lever on said apron for effecting all of said movements, said control lever comprising a handle mounted on a rock shaft and movable thereon in a horizontal plane to select traverse movements for either the carriage or cross slide and movable in a vertical plane to rotate said rock shaft to render said traverse movements operative, means connecting said rock shaft to said source of rapid traverse power comprising, a pair of rapid traverse clutch assemblies adapted to connect or disconnect rapid traverse power to or from said carriage or cross slide, a yoke for actuating one or the other of said clutches, and rack and pinion means interconnecting said yoke with said rock shaft.

2. In a lathe, an apron, means in said apron for effecting rapid traverse movements in the carriage and cross slide in either direction, a single control lever on said apron for effecting all of said movements, said control lever comprising a handle mounted on a rock shaft and movable thereon in a horizontal plane to select traverse movements for either the carriage or cross slide and movable in a vertical plane to rotate said rock shaft to render said traverse movements operative, means connecting said rock shaft to said source of rapid traverse power comprising, a pair of rapid traverse clutch assemblies adapted to connect or disconnect rapid traverse power to or from said carriage or cross slide, a yoke incorporating a self-aligning ball bearing for actuating one or the other of said clutches, and reduction gearing between said rock shaft and said yoke.

3. In a lathe, an apron, power feeding mechanism in said apron incorporating a pinion engaging a rack on the bed of said lathe for effecting longitudinal movement of the carriage on said bed, means for withdrawing said pinion from said rack, rapid power traverse mechanism associated with said power feeding mechanism for rapid traversing said carriage or cross slide, said rapid traverse mechanism being effective to rapid traverse said cross slide when said pinion is disengaged from said rack.

4. In a machine tool, a member movable relative to another member, dial indicating mechanism associated with said first mentioned member for indicating its relative travel in respect to said second mentioned member comprising a graduated collar rotatably mounted on the periphery of a disc driven by the movement of said first mentioned member, and single hand controlled means for effecting rotation and locking of said graduated collar on said disc.

5. In a machine tool, a member movable relative to another member, dial indicating mechanism associated with said first mentioned member for indicating its relative travel in respect to said second mentioned member comprising a graduated collar rotatably mounted on the periphery of a disc driven by the movement of said first mentioned member, and single hand controlled means for effecting rotation and locking of said graduated collar on said disc, comprising a pair of over-running clutch rollers engaging said collar and said disc and a pair of pinchers pivotally mounted on said collar, adapted for rotating said collar and rendering said over running clutches ineffective when pinched between the fingers when selecting positions of said collar on said disc and to automatically allow said clutches to lock said collar to said disc when released at a selected position.

6. In a lathe, a carriage, a cross slide mounted on said carriage, an apron mounted on said carriage, mechanism in said apron for actuating said cross slide in feeding and rapid traverse movements, cross stop mechanism for limiting the extent of movement of said cross slide, and means for automatically rendering said cross stop ineffective when said cross slide is being operated in feeding movement.

7. In a lathe, a carriage, a cross slide mounted on said carriage, an apron mounted on said carriage, manual means for actuating said cross slide, power feed mechanism in said apron for actuating said cross slide at feeding speeds, power rapid traverse mechanism in said apron for actuating said cross slide at rapid traverse speeds, cross stop mechanism on said carriage for limiting the extent of movement of said cross slide, said cross stop step being effective only when said cross slide is operated manually or by said power rapid traverse mechanism.

8. In a lathe, a carriage, a cross slide reciprocatably mounted on said carriage, an apron mounted on said carriage, power feed mechanism in said apron for reciprocating said cross slide, power rapid traverse mechanism in said apron for reciprocating said cross slide, a control means on said apron for rendering said power cross feed mechanism operative, control means on said apron for rendering said power rapid traverse mechanism operative, cross stop mechanism associated with said cross slide for limiting the extent of the reciprocatory movement of said slide, means operable by the movement of the control means for said power cross feed mechanism to render said cross stop mechanism inoperative when said power cross feed mechanism is operating.

9. In a lathe, a carriage, a cross slide mounted on said carriage, an apron mounted on said carriage, power cross feeding mechanism in said apron for actuating said cross slide, power rapid traverse mechanism in said apron for actuating said cross slide, cross stop mechanism associated with said cross slide for limiting its movement on said carriage, means for automatically rendering said cross stop inoperative when said power feed mechanism is operating, and means for manually rendering said cross stop mechanism inoperative.

10. In a lathe, a carriage, a cross slide reciprocatably mounted on said carriage, an apron mounted on said carriage, power feed mechanism in said apron for actuating said carriage and said cross slide in feeding movement, power rapid traverse mechanism in said apron for actuating said carriage and cross slide in rapid traverse movement, cross stop mechanism associated with said cross slide to limit its reciprocatory movement on said carriage and means for automatically rendering said cross stop mechanism inoperative when said power feed mechanism is connected for actuating said cross feed screw at feeding rates.

11. In a lathe, a carriage, a cross slide reciprocatably mounted on said carriage, an apron mounted on said carriage, cross stop mechanism associated with said cross slide, rapid power traverse mechanism in said apron for actuating said cross slide in rapid traverse movements, manual means for actuating said cross slide, and means whereby said cross stop mechanism is effective when actuating said cross slide either manually or by power rapid traverse mechanism.

12. In a lathe, a carriage, a cross slide reciprocatably mounted on said carriage, an apron, a cross feed screw for actuating said cross slide, dial indicating mechanism associated with said cross feed screw for indicating the extent of travel of said cross slide, said dial indicating mechanism comprising a pair of differentially operated graduated collars the summation of whose readings indicates the total travel in inches and thousandths of an inch of said cross slide, cross stop mechanism associated with said cross feed screw and dial indicating mechanism, power cross feeding mechanism in said apron adapted to drive said cross feed screw, power rapid traverse mechanism adapted to drive said cross feed screw and manual means mounted on said cross feed screw, and interlocking mechanism between said power cross feeding mechanism and said cross stop mechanism whereby said cross stop mechanism is rendered inoperative when said cross feed screw is being driven by said power cross feed mechanism.

13. In a lathe, a bed, a carriage reciprocable on said bed, an apron mounted on said carriage, reversible power feed mechanism in said apron, a feed rod mounted on the bed of said lathe for driving said mechanism, reversible power transmission mechanism between the lathe headstock and said feed rod, means for controlling the reversal of said feed rod comprising a rotatable and axially reciprocatable feed control rod associated with said apron, stops on said control rod adapted to be engaged by the movement of said apron as the carriage moves along said bed for effecting axial and rotary movement in said control rod, said stops having a member slidably mounted on said control rod and having engageable and disengageable means for engaging threads on said control rod whereby said stops may be rapidly adjusted axially of said control rod and may be accurately adjusted when approximately positioned on said rod.

14. In a lathe, an apron movable longitudinally of the bed of said lathe, a feed control rod associated with said apron, dogs on said control rod engageable by said apron for reversing the direction of movement of said apron comprising a member slidably mounted on threads formed on said control rod and having an eccentrically movable nut of greater pitch than but of the same number of threads as the thread on said control rod, means for forcing said nut eccentrically of said control rod and means whereby said nut may be manually positioned concentric therewith for rapidly sliding said dog along said control rod.

WILLIAM F. GROENE.
HARRY C. KEMPER.